Sept. 29, 1970     N. O. YOUNG     3,530,726
ACCELEROMETER
Filed Jan. 3, 1967

INVENTOR.
NIELS O. YOUNG
BY
Robert J. Schiller
ATTORNEY

United States Patent Office 3,530,726
Patented Sept. 29, 1970

3,530,726
ACCELEROMETER
Niels O. Young, Lincoln, Mass., assignor to Block Engineering, Inc., a corporation of Delaware
Filed Jan. 3, 1967, Ser. No. 606,671
Int. Cl. G01p 15/08
U.S. Cl. 73—516                                                5 Claims

ABSTRACT OF THE DISCLOSURE

The following specification describes several embodiments of an accelerometric device which typically comprises a glass capillary tube filled with an electrolytic solution in contact with which is a globule of mercury constrained by the tube to be movable only along the long axis of the tube. A pair of electrodes are positioned adjacent each end of the tube in electrical contact with opposite sides of the mercury droplet to detect any potential developed across the latter due to distortion of the interface between the droplet and electrolytic solution when the device is subject to acceleration with a component along the tube axis.

---

This invention relates to accelerometers and more particularly to novel devices for producing electrical signals proportional to accelerated forces.

A fairly large variety of accelerometers are known. Among the most commonly used types of accelerometers are those devices using a magnetic circuit element and coil and the piezo-electric type. Typically, the latter comprises a piezo-electric piezoceramic crystal mounted so that it can become stressed with but a single degree of freedom, the crystal acting as a spring support for a relatively large seismic mass. The potential developed across the crystal is proportional to acceleration imparted to the mass along the degree of freedom of the crystal. In the magnetic circuit element type either the coil or armature is movable with respect to the other, the movable element representing the seismic mass being mounted on a compliant suspension. Thus, both devices use transducers which generate an electrical signal from a force and can readily be distinguished from other devices wherein the impedance to an existing A.C. or D.C. bias is modified or modulated by acceleration as in certain strain gauge transducers and electronic tubes having grids which deflect responsively to an acceleration. In both of these classes of devices, the sensitivity increases with the magnitude of the mass. However, the latter usually determines the resonant point which sets a limit on the useful frequency response, an upper limit in the case of the piezo-electric type and lower limit in the case of the piezo-electric type and lower limit in the case of the magnetic circuit type. Because for reasonable sensitivity both types require substantially bulky seismic masses, there are practical limitations on the smallness with which the device can be made. A number of applications are known in which it is highly desirable to have a sensitive but very small accelerometer. For the foregoing reasons, the usual accelerometers are ill adapted to meet such needs.

The present invention, therefore, has as a principal object the provision of an accelerometer which can be readily miniaturized while yet preserving other desirable features such as reasonably high sensitivity and adequate frequency response.

Another object of the present invention is to provide an accelerometer in which an electrical potential is developed by accelerations by virtue of the phenomenon of electrocapillarity.

To effect the foregoing and other objects, the present invention, therefore, comprises at least one coherent mass of normally liquid metal and a body of electrolytic liquid forming an interface with the metallic mass. Means are provided for constraining the motion of the mass to a single degree of freedom so that the surface of the mass at the liquid-liquid interface is altered when the mass is subjected to an acceleration having a component along a path constrained to the single degree of freedom. The device further includes electrodes connected for detecting any potential developed between end portions of the mass with respect to the path when the interface is altered.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings, wherein.

In all of the foregoing figures, the cross-section is taken through the embodiment substantially along a line defining the path to which the single degree of freedom of motion of a seismic mass of the accelerometer is limited.

Generally, accelerometers of the present invention incorporate a seismic mass in the form of a coherent body of metal which is normally liquid, i.e. under ordinary conditions of temperature and degrees, such as within the range of 0–40° C. and about 760 mm. Hg. Within these ranges, of course, one finds materials such as mercury, gallium, cesium, rubidium, potassium-sodium alloy and various alloys of these metals which are liquid above the respective temperatures of about −38, +30, +29, and +39 degrees C. Of these metals, mercury has the highest density and therefore is most suitable for a miniaturized seismic mass. Liquid metals tend to form coherent masses such as globules with fairly high surface tension due to the internal coherence of the molecules and the lack of mechanical strength of rigidity characteristic of liquids. The liquid metal not only serves as a seismic mass in the accelerometer of the invention but also can constitute a seismic spring. In the event that mercury is used as the seismic mass, it need not be absolutely pure but can constitute a suitable amount of amalgamated metals such as gallium or one of the alkali metals.

The liquid metal forms, as previously noted, an interface with an electrolytic solution, i.e. an electrolyte and a solvent in which the electrolyte is dissolved. Typically, the solvent can be water, liquid ammonia, dimethyl formamide, pyridine, or the like. The electrolyte can be of any of a very large number of compounds which preferably dissociate substantially completely in the solvent. The electrolyte can be a dissociatable salt, acid or base. A material that will completely dissociate to form an approximately neutral solution, such as an alkali metal halide in water, is preferred. Thus, the detailed description following, a preferred electrolytic solution is a 1 M KI aqueous solution.

It is known that the surface tension between two contacting, ionically or electrically conducting, immiscible liquids, is sensibly altered when an electrical potential is set up across the interface. This is a reversible phenomenon in that alteration of the surface tension between two such liquids will create a potential. This effect is known as electrocapillary and is described in a number of texts such as Physicochemical Hydrodynamics, V. G. Levich, p. 512, Prentice-Hall, 1962. It will be appreciated that where the surface area of such an interface is altered by an accelerative force there is a change in surface tension at the interface, the potential developed then being indicative of the magnitude of the acceleration.

Figure 1:
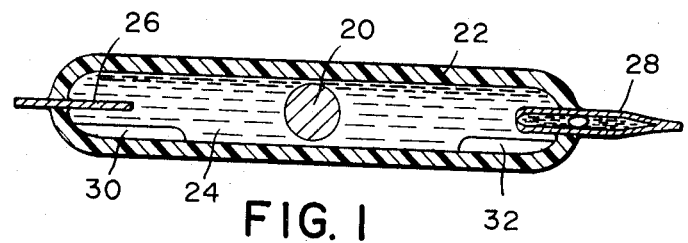
FIG. 1 is a cross-section through a typical embodiment incorporating the principles of the present invention.

Thus, referring to FIG. 1, there is shown an embodiment of the present invention including a seismic mass in the form of globule 20 of mercury disposed with an elongated cylindrical chamber or sealed enclosure 22 formed of an insulating material such as glass. Globule 20 occupies but a small portion of the interior of enclosure 22, the remainder of the interior being substantially filled with electrolytic fluid 24 such as 1 M KI in water. Electrical connection is made at one end of enclosure 22 as by elongated electrode 26 which is sealed into the glass, extends outwardly from the exterior of enclosure 22 and contacts fluid 24 at the interior of the enclosure. Typically electrode 26 can be a platinum wire or the like. The other end of enclosure 22 has sealed therein another elongated electrode 28 extending from the outside of the enclosure into physical contact with fluid 24. Electrode 28 preferably is a hollow platinum tube through which the liquids and gases can be introduced initially. When filling the enclosure it is advisable to leave a small air bubble entrapped in electrode 28 to relieve internal pressures due to thermal expansion. To insure entrapment, the internal end of electrode in contact with the fluid is reduced somewhat in diameter. The outer or other end of the electrode is closed or sealed as by crimping, which may be followed by welding the distal end.

In the preferred embodiment, enclosure 22 is a straight tube of substantially uniform internal diameter, at least between the internal ends of the electrodes, and globule 20 is dimensioned to be slightly lesser in cross-sectional area than the internal cross-sectional area of enclosure 22. It will be apparent that although the globule is therefore free to move, enclosure 22 imposes on the globule the required constraint on freedom of motion of the latter. Means are provided to insure that globule 20 cannot move longitudinally along the enclosure in either direction sufficiently to achieve actual physical contact with either internal end of the electrode. To this end there are provided a pair of limit stops or abutments 30 and 32, for example, of glass, mounted adjacent respective ends of the interior of the enclosure as by fusion.

Figure 3:
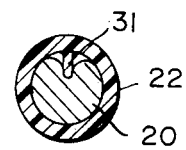
FIG. 3 is a cross-section of the embodiment of FIG. 2 taken along the line 3—3.
Figure 2:
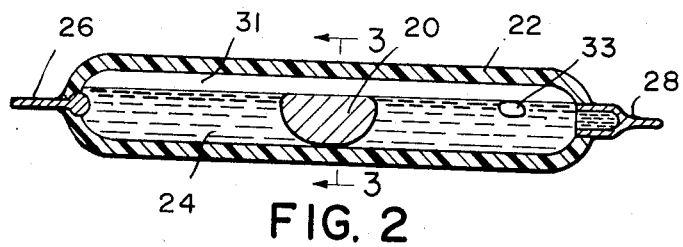
FIG. 2 is a cross-section through another embodiment which is a variation of the device of FIG. 1.

A modification of the device of FIG. 1 is shown in FIG. 2, like numerals denoting like parts. As shown, the device of FIG. 2 includes at least one ridge or tongue 31 extending longitudinally along the internal wall of enclosure 22 and protruding radially into the interior of the latter. Thus, particularly as shown in FIG. 3, mercury drop or globule 20 need not, as in FIG. 1, have a diameter less than the inside diameter of enclosure 22 but may be considerably larger and elongated. However, because of tongue 31, the larger globule is held from completely contacting the interior wall of enclosure 22 and hence an electrolytic solution by-pass path is provided.

Further, as is seen in FIG. 2, electrolytic solution 24 does not entirely fill the interior of enclosure 22 but space is provided for gas bubble 33 which allows room for thermally induced volumetric changes.

In operation of the embodiments of FIGS. 1 and 2, electrodes 26 and 28 are connected to an electrometric device (not shown), preferably a high input impedance volt meter or the like, so as to measure any potential developed by alteration of the surface area of the interface between globule 20 and electrolytic fluid 24. The accelerometer is then subjected to an acceleration having a component axially directed along enclosure 22. Because the inertia of globule 20 is high compared to that of the electrolytic fluid, the force created by an acceleration tends to force the globule to move and bulge relative to the fluid, thus setting up a potential difference between the ends of the globule with respect to the axis of the enclosure. Motion of the globule toward either end of the enclosure in response to the force created by the acceleration is not resisted by compression of the electrolytic fluid because the latter, displaced by the globule emotion, is free to flow around the globule by virtue either of the size of the globule relative to the inside diameter of the enclosure as in FIG. 1 or by the flow path provided by tongue 31 of FIG. 2. The electrolytic fluid serves as a conductive path for the potential developed across the globule. Thus, because the electrodes are in contact with the fluid adjacent each end of the globule, the potential across the globule will be detected by the electrodes.

Figure 7:
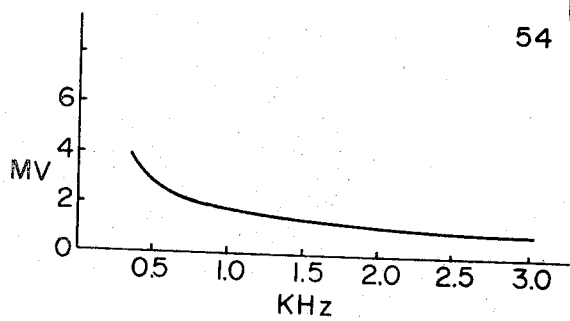
FIG. 7 is a graphical representation of a typical response curve of a device such as is shown in FIG. 2.

In operation typically with a 1 M KI electrolyte and mercury globules of about 200$\mu$ diameters, for an applied acceleration of 8.8 g at various frequencies a typical curve of the potential appearing at leads 54 and 56 is shown graphically in FIG. 7.

Figure 4:
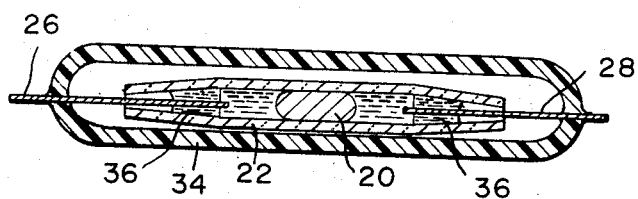
FIG. 4 is a cross-section through yet another embodiment of an accelerometer incorporating the principles of the present invention.

As shown in FIG. 4, an alternative embodiment very similar to FIG. 1 can be readily constructed. However, in the embodiment of FIG. 4, the ends of the enclosure through which the electrodes extend are open, and the entire enclosure is then sealed within and spaced from the interior surface of approximately coaxial hollow enclosure 34. In this construction, globule 20 need not be lesser in cross-sectional area than the interior cross-sectional area of enclosure 22 but can extend completely across the diameter of the latter. It will be seen therefore that the build-up of pressure on either end of the globule due to globule movement within enclosure 22 is relieved by the exterior pnuematic path provided by the interspace between enclosure 22 and 32 and the open ends of enclosure 22. In the preferred configuration of the embodiment of FIG. 4, a small amount of fluid having a very low partial vapor pressure, such as silicone oil 36 is disposed within the open extremities of enclosure 22, thereby preventing evaporation of the electrolytic fluid from within the enclosure. Also the open ends of enclosure 22 in FIG. 4 are tapered so that the openings are quite small and the surface tension of the silicone oil prevents leakage of the fluids out of the interior of enclosure 22. This particular embodiment, while more complex than that of FIG. 1, possesses the advantage that it needs no additional means for compensating for thermal expansion effects such as an air or gas bubble. Thus, electrode 28 need not be the hollow tube of FIG. 1 but can simply be a fine wire similar to electrode 26. Of course the embodiment shown in FIG. 4 operates substantially in the same manner as that of FIG. 1 except that instead of preventing compression of the electrolytic fluid by hydraulic flow of the latter around the globule, a pneumatic bypass path is provided.

Figure 5:
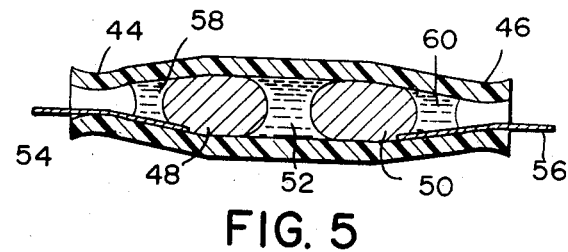
FIG. 5 is a cross-section of yet a further embodiment of an accelerometer incorporating the principles of the present invention.

Referring now to FIG. 5, there is shown yet another embodiment of the invention which includes an elongated, electrically insulating enclosure 42, the bulk of which has a cylindrical, hollow interior of uniform cross-sectional dimensions, the ends 44 and 46 of enclosure 42 being internally tapered down and open to the ambient atmosphere. Disposed within enclosure 42 and adjacent each end thereof are a pair of liquid metal globules 48 and 50, spaced from one another. The interspace between globules 48 and 50 is completely filled with electrolytic fluid 52. Disposed in each end of enclosure 42 are respectively electrodes or leads 54 and 56, for example cemented or otherwise affixed to the interior wall or enclosure 42. Each electrode extends sufficiently into the interior of enclosure 42 so as always to be in mechanical and electrical contact with the respective adjacent globule, but not in contact with fluid 52. Globule 48 is separated from the opening at end 44 by a small amount of an electrically insulating fluid 58 having a low partial vapor pressure and, of course, being chemically nonreactive with any of the other components of the structure. Similarly, end 46 is provided with a small amount of such fluid 60.

Now with respect to the embodiment shown in FIG. 5, when the accelerometer is subject to an acceleration having a component along enclosure 42 (for example, from right to left with respect to the drawings), globules 48 and 50 will tend to move toward the right. Globule 50 is then forced into the taper at end 46. Although globule 48 is not constrained by any taper in the interior surface of enclosure 42, the incompressibility of fluid 52 insures that globule 48 will not be displaced substantially more than globule 50. Of course, the alteration of the surface tension of the globules at their interfaces with respect to fluid 52 will give rise to a potential. Because the electrodes are in direct physical and electrical contact with the globules, this potential can be readily determined by a measuring device connected to the electrodes. When the acceleration ceases, the surface tension of globule 50 forces the latter toward its minimum energy configuration, therefore tending to move globule 50 out of the tapered end of tube 46 and restoring the two globules to their original position. In essence, the globule and taper serve to provide a restoring spring force which returns the twin globule and electrolyte system to an equilibrium position.

Not only do the silicone oil seals serve to minimize contamination or oxidation of the mercury globules, but if the viscosity of the silicone oil is carefully selected, they also provide substantial mechanical damping of the system to avoid overshoot.

The liquid system show in FIG. 5 is normally highly damped. One can adjust the spring rate or restoring force (and hence the resonant frequency) of the system by altering the taper of the enclosure ends. Thus, the resonant frequency can be readily established well below 50 c.p.s. which for the typical embodiment above described allows measurements to be made above resonance to a limit, for example about 10 kc., set by the response time of the electrocapillarity effect to reach an equilibrium potential.

Figure 6:
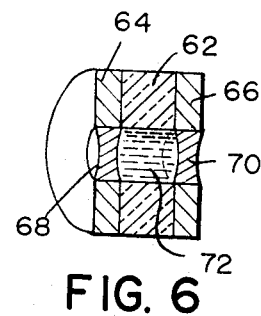
FIG. 6 is a cut-away cross-section through yet another embodiment, similar to FIG. 4, of the present invention.

The embodiment shown in FIG. 6 is quite similar in principle of that shown in FIG. 5. As shown in FIG. 6, the device includes the usual hollow cylindrical enclosure 62 having electrodes 64 and 66 in the form of a pair of platinum or alloy rings or apertured washers positioned around each end at enclosure 62. Two liquid bodies 68 and 70 are provided at each end of the enclosure in contact respectively with electrodes 64 and 66, each liquid body being electrically conductive, metallic fluids, such as mercury, completely filling the central aperture of its respective electrode. The two liquid bodies are separated from one another by an interior portion of enclosure 62 completely filled with electrolytic fluid 72. Bodies 68 and 70, combined with fluid 72, constitute the seismic mass of the device. The outside surface of the seismic mass can be thinly coated if desired with a protective fluid such as silicone oil or a thin sheet of plastic material. It will be recognized that the embodiment of FIG. 6 operates substantially in the same manner as that of FIG. 5 but no restoring force is provided by an interior taper. Instead, restoring forces acting on the seismic masses are provided by internal cohesion of the masses and the adhesion due to surface wetting of the electrodes by the mercury. The electrodes therefore preferably are treated by having gold or a similar metal diffused into the surface to insure wetting by the liquid metal with minimum electrode attack by amalgamation.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:
1. An accelerometer comprising, in combination:
  at least one coherent first body of normally liquid metal;
  a second body of electrolytic liquid contacting said first body;
  an elongated, hollow, electrically insulating enclosure having a substantially uniform interior cross-section dimensioned along a portion thereof in the direction of the axis of elongation and containing both said bodies so as substantially to constrain their total mass to a single degree of freedom of motion when subject to acceleration;
  said first body being a single globule having a maximum cross-sectional area less than the interior cross-sectional area of said enclosure portion, and
  means for detecting potential developed between end portions of said mass along the line of said motion.
2. An accelerometer as defined in claim 1 wherein said enclosure is sealed;
  the interior thereof being substantially completely filled with said bodies such that said second body substantially surrounds said first body, said enclosure portion being substantially longer than the diameter of said globule so that the latter is movable through said second body along said axis;
  said means for detecting comprising a pair of electrodes contacting said second body respectively at opposite ends of said enclosure;
  said accelerometer including stop means for limiting motion of said globule along said axis so that said globule cannot physically contact said electrodes.
3. An accelerometer as defined in claim 2 wherein;
  the end portions of said enclosure each are interiorly tapered to a smaller diameter so as to constitute said stop means.
4. An accelerometer as defined in claim 1 wherein said liquid metal is selected from the group of metals consisting of mercury, gallium, cesium, rubidium, potassium-sodium alloy, and normally liquid alloys of the aforesaid metals.
5. An accelerometer as defined in claim 4 wherein said electrolytic liquid is formed of a polar solvent and an electrolyte dissolved in said solvent so as to provide a substantially neutral, dissociated solution.

References Cited

UNITED STATES PATENTS

| 2,407,363 | 9/1946 | Bussey | 310—2 |
| 2,431,367 | 11/1947 | Bussey | 310—2 |
| 2,454,497 | 11/1948 | Ashton | 310—2 |
| 2,735,949 | 2/1956 | Podolsky | 73—518 XR |
| 2,837,082 | 6/1958 | Elliott et al. | 73—517 XR |
| 3,317,760 | 5/1967 | Coleman et al. | 73—516 XR |

FOREIGN PATENTS

| 72,020 | 3/1960 | France. |
| 404,799 | 10/1924 | Germany. |

JAMES J. GILL, Primary Examiner

U.S. Cl. X.R.

310—2